April 25, 1961  C. C. GEIB ET AL  2,981,872
SELENIUM RECTIFIER

Filed Aug. 20, 1953  2 Sheets-Sheet 1

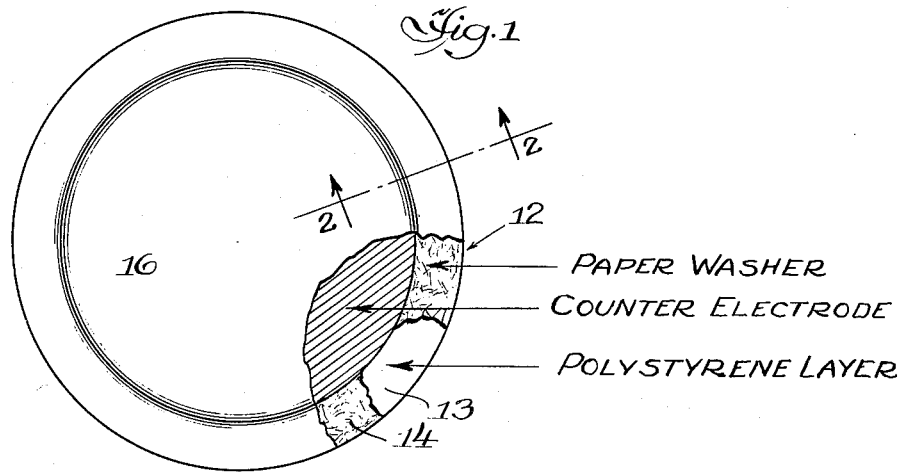

Fig. 1 — PAPER WASHER, COUNTER ELECTRODE, POLYSTYRENE LAYER

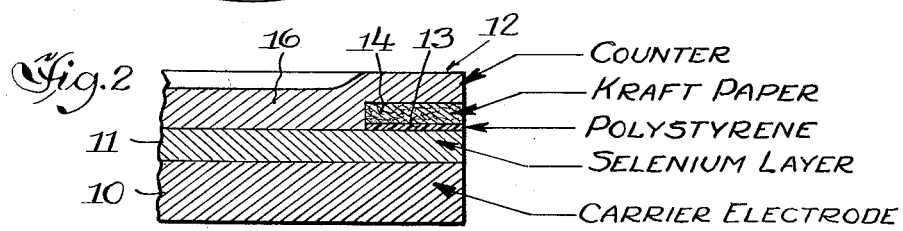

Fig. 2 — COUNTER, KRAFT PAPER, POLYSTYRENE, SELENIUM LAYER, CARRIER ELECTRODE

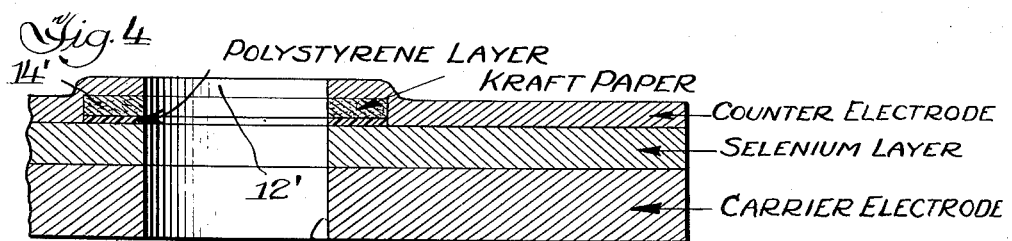

Fig. 4 — POLYSTYRENE LAYER, KRAFT PAPER, COUNTER ELECTRODE, SELENIUM LAYER, CARRIER ELECTRODE

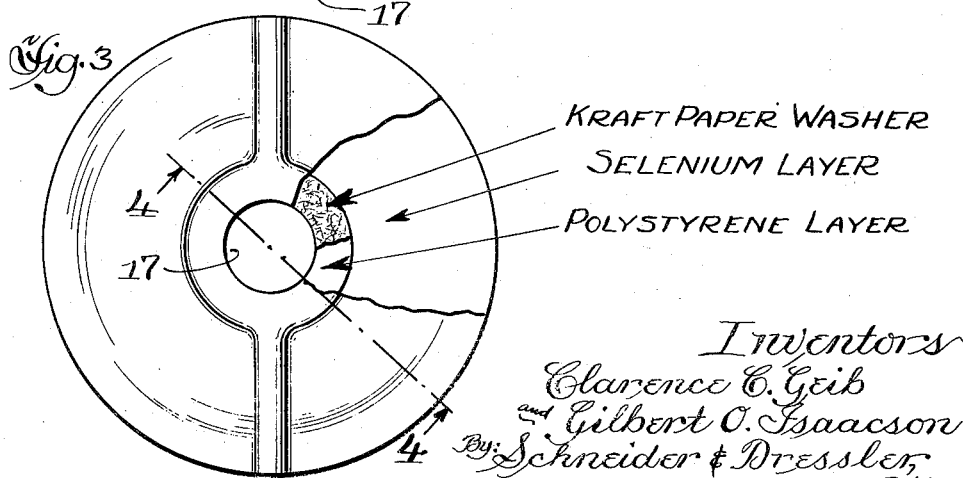

Fig. 3 — KRAFT PAPER WASHER, SELENIUM LAYER, POLYSTYRENE LAYER

Inventors
Clarence C. Geib
and Gilbert O. Isaacson
By Schneider & Dressler,
Attys.

April 25, 1961     C. C. GEIB ET AL     2,981,872
SELENIUM RECTIFIER

Filed Aug. 20, 1953     2 Sheets-Sheet 2

Inventors,
Clarence C. Geib
and Gilbert O. Isaacson
By: Schneider & Dressler,
Attys.

United States Patent Office 2,981,872
Patented Apr. 25, 1961

2,981,872
SELENIUM RECTIFIER

Clarence C. Geib, Zion, and Gilbert O. Isaacson, Waukegan, Ill., assignors to Fansteel Metallurgical Corporation, a corporation of New York Filed Aug. 20, 1953, Ser. No. 375,363

3 Claims. (Cl. 317—234)

This invention relates to a selenium rectifier and to a method of making the same. In particular, the invention relates to a novel rectifier having a pressure-insensitive region and method of making the same.

A selenium rectifier consists of a base or carrier plate or electrode having a suitable metallic surface upon which there is disposed a layer of selenium. This layer exists in a suitable crystalline form and has the surface of the selenium remote from the base plate adapted to function as a blocking layer. This blocking layer may either consist of the selenium surface itself or may be created by the application of suitable materials, such as lacquers and other well known materials for providing a blocking layer. A counterelectrode of suitable metal or alloy is disposed over the blocking layer to complete the selenium rectifier.

In use, it is necessary to clamp one or more rectifiers without deleteriously affecting the operating characteristics of said rectifiers. As is well known, the rectifying and blocking characteristics of a selenium rectifier are greatly influenced by the pressure to which the selenium and blocking layer is subjected. Various expedients have been relied upon to desensitize a region on the rectifier, such region taking the clamping pressure for one or more rectifiers. While various means for obtaining such a desensitizing action are known, such means have various drawbacks and usually result in increased manufacturing costs. The invention provides a rectifier having desired desensitized areas and being susceptible to stacking and conventional handling. This invention also provides a method for making selenium rectifiers having desensitized areas.

The invention in general contemplates the use of thermoplastic materials alone or in combination with kraft paper as a filler for a part of the region normally occupied by the counterelectrode. The filler is introduced on the surface of the selenium layer at a desired part of the surface when the selenium layer is normally ready to have applied thereto a counterelectrode. As is well known, after a uniform layer of crystalline selenium has been provided on a carrier electrode and a blocking layer usually has been provided, the counterelectrode is customarily sprayed on, the counterelectrode material itself consisting of a low melting metal or alloy. Inasmuch as the general steps in the manufacture of a selenium rectifier are well known, no details will be given except where required to show the order of procedure.

When the counterelectrode is ready to be applied to a selenium layer, the selenium itself has already been annealed. It is therefore important that the selenium be kept below its melting point. Inasmuch as this invention contemplates the use of thermoplastic material, it follows that only those materials which will soften substantially below the melting point of selenium are useful. Such thermoplastic materials have the desirable property of good adherence to counterelectrode material. Of the thermoplastic materials, polystyrene is particularly desirable and is readily available. However, other thermoplastic materials may be used, such as for example acrylate resins such as methacrylate, casein plastics, cellulose plastics such as cellulose nitrate, cellulose acetate and the like, vinyl resins, polystyrene resins, and the like.

These thermoplastic materials have been found to have desirable properties of melting or softening below the melting point of selenium, suitable resistance to electric current flow, suitable adherence to selenium, and ease in handling.

The thermoplastic material used improves the dielectric properties of the kraft paper and also endows the desensitized region with some desirable compressibility.

Rectifiers embodying the invention may therefore be clamped under a substantial range of pressure without damage. In general, all thermoplastic material having good adherence to selenium and providing adequate electrical insulation may be used.

In order that the invention may be fully understood, it will now be explained in connection with the drawings, wherein exemplary embodiments of rectifiers embodying the invention and resulting from the new methods of making the rectifier are shown, it being understood that additional modifications may be made without departing from the scope of the invention. Referring to the drawings:

Figure 1 is a top plan view, with certain parts broken away, of one form of a rectifier embodying the present invention;

Figure 2 is an enlarged sectional detail on line 2—2 of Figure 1;

Figure 3 is a plan view of a modified form of rectifier embodying the present invention;

Figure 4 is a sectional detail on line 4—4 of Figure 3;

Figure 5:
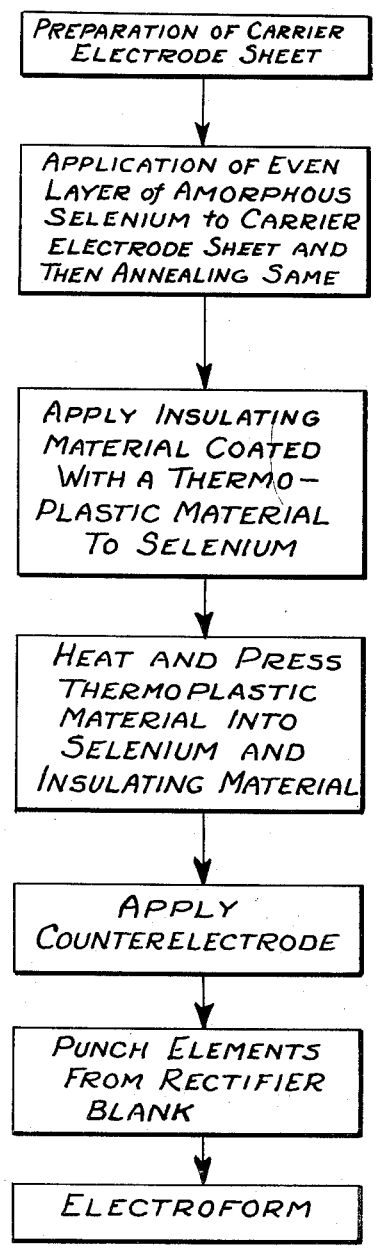
Figure 5 is a block diagram illustrating the various steps in the new method of manufacturing rectifiers embodying the present invention.

Referring first to Figures 1 and 2, electrode 10 has selenium layer 11 disposed thereover. The rectifier illustrated in Figure 1 is of the type adapted for marginal clamping or retention. Accordingly, an annular marginal region generally indicated by 12 is provided, this region being desensitized. Desensitized region 12 includes layer 13 of thermoplastic material, such as polystyrene for example, or any of the other resins or materials previously mentioned.

While the thermoplastic material of which layer 13 is formed may be in sheet form and may fill the entire desensitized region, it is preferred to use washer 14 of kraft paper in association with the thermoplastic material. This preference is based upon practical considerations incident to the manufacture of the rectifier. As shown in Figure 2, counterelectrode 16 is disposed over the selenium and over the desensitized region 12. While Figure 2 shows the thickness of the various layers in greatly enlarged form, in practice, the selenium layer and the counterelectrode are thin, usually being of the order of about three or four thousandths of an inch.

The carrier electrode is customarily heavier and in practice may have a thickness of about twenty thousandths of an inch, the thickness being sufficient so that the carrier electrode is generally self-supporting. It is understood, of course, that the thickness of carrier electrode 10 is not shown in proper proportion to the thickness of the remaining parts of the rectifier. In fact, Figure 2 does not even purport to show the relative thicknesses of the selenium layer and counterelectrode. Because of the thinness of the counterelectrode, it is more convenient to use kraft paper impregnated with or coated with the thermoplastic material.

The paper itself is available in various thicknesses, any grade of paper having a generally uniform thickness within satisfactory limits may be used. By applying the thermoplastic material in a generally liquid or soft form to the paper initially, as will be more fully set forth in the description of the method, a filler having accurate thickness and suitable adherence to the selenium may be used for providing a desensitized region. The treated side of the paper contacts the selenium layer.

Counterelectrode 16 is generally sprayed on so that the thickness of the counterelectrode tends to be more or less uniform. Consequently, the portion of the counterelectrode above desensitized region 12 will generally be elevated somewhat above the level of the body of the rectifier. This is desirable since it results in a thick rim for the rectifier where clamping may be provided without affecting the rectifier proper. The paper at the edge of the rectifier also prevents flash-over during electroforming.

Figure 7:
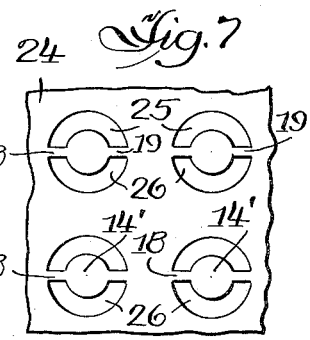

Referring to Figures 3 and 4, a modified form of rectifier is shown wherein central aperture 17 through the rectifier assembly is provided for stack mounting around a bolt or rod. It is understood, of course, that the bolt or rod is provided with suitable insulation to prevent short-circuiting of each rectifier. The rectifier illustrated in Figures 3 and 4 has desensitized region generally indicated by numeral 12' including an apertured paper washer 14' disposed at the inner portion of the rectifier immediately bordering the aperture. The washer has outwardly extending arms 18 and 19 (see Figure 7) formed by the paper, these arms being dictated by manufacturing convenience, as will be apparent later in a description of the method of manufacturing. The details of the thermoplastic resin and kraft paper are generally similar to those set forth in connection with Figures 1 and 2.

As is evident in Figures 3 and 4, the counterelectrode portion above the desensitized region is elevated somewhat above the general level of the rectifier, thus providing a convenient annular region for taking clamping pressure.

Referring now to Figure 5, the various steps in the manufacture of the rectifiers, illustrated in Figures 1 to 4 inclusive, are set forth. It is customary to manufacture the rectifiers in multiple from large sheets and finally punch individual rectifiers from a large rectifier blank. However, the process or method is equally applicable to the manufacture of individual rectifiers, as will be readily apparent.

The manufacture of the rectifier begins with the preparation of a carrier electrode sheet. Inasmuch as the composition and preparation of such a carrier electrode sheet is well known, it will not be set forth in detail. After the carrier electrode sheet has been properly prepared, an even layer of amorphous selenium is disposed upon the sheet, then subjected to a hot press for melting the selenium to form a desired selenium layer. The selenium layer is thereafter heat-treated and annealed in order to change the amorphous selenium to the crystalline form. A blocking layer is created on the selenium in any one of a number of ways all well known in the art. In certain instances, the selenium is left to form its own blocking layer.

The rectifier blank now has a carrier electrode sheet coated with selenium which has been heat-treated and would ordinarily be ready for the application of the counterelectrode. The kraft paper to be used is next applied. This kraft paper has one side thereof sprayed, painted, or otherwise covered with the thermoplastic material to be used. While both sides of the paper may be sprayed or painted, if desired, it is sufficient to apply the material on one side only. The material is dissolved in a suitable volatile solvent for spraying or painting, the solvents for these materials being generally well known.

The thermoplastic material is left as a thin coating which penetrates the pores of the kraft paper. In the case of polystyrene, a solvent such as Cellosolve may be used. Instead of dissolving the thermoplastic material in a solvent, it may be heated until it is thin enough for working upon the paper. Inasmuch as the thermoplastic material is not yet in contact with the selenium, it may be heated to any desired temperature for softening.

Figure 6:
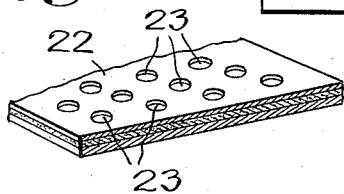
Figures 6 and 7 illustrate the perforated paper sheets used in the manufacture of the rectifiers of Figures 1 and 3 respectively.

For manufacturing the rectifiers shown in Figures 1 and 2, a large sheet 22 of kraft paper, having apertures 23 punched out therefrom at intervals, as illustrated in Figure 6, may be used. The diameter of each aperture 23 will correspond to the inside diameter of washer 14. In the final punching operation, by having each punch in proper position relative to an aperture in the paper, each rectifier will have an annular washer as shown.

For manufacturing rectifiers as illustrated in Figures 3 and 4, sheet 24 of kraft paper is provided. Sheet 24 has, for each rectifier to be later punched out, a pair of curved cut-outs 25 and 26 disposed around washer portion 14'. Upon final punching of a rectifier from the sheet, each washer 14' will have arms 18 and 19. Obviously, arms 18 and 19 should be as narrow as possible since they reduce the effective area of the rectifier. If desired, more than two arms may be used.

In both cases, the paper, after suitable treatment with a thermoplastic material, is applied to the surface of the selenium layer with the treated side on the selenium layer, and is hot-pressed to the selenium layer. This hot press, however, must have no deleterious effects upon the selenium. In the case polystyrene, a temperature of 82° C. has been used with a pressure of a few hundred pounds per square inch. The temperature and pressure, however, may be varied over wide ranges so long as the selenium layer or crystalline formation thereof or the blocking layer is not deleteriously affected. The pressure and temperature must be such as to force the thermoplastic material into the irregular contours of the selenium layer. This provides good bonding. Pressures ordinarily from about 100 to about 300 pounds per square inch may be satisfactorily used. However, in some instances, the pressure may go up as high as 2,000 and even 3,000 pounds per square inch.

After the thermoplastic material and paper have been applied, the counterelectrode is applied in the usual manner, as by spraying, this procedure being well known and requiring no detailed explanation. The rectifier blank is ready to have the individual rectifiers punched therefrom, after which the individual rectifiers are electroformed in the usual manner.

While circular rectifiers are illustrated, other shapes may be used. It is possible to have rectangular shapes for the rectifier and provide a desensitized region along one margin or portion thereof.

What is claimed is:

1. A selenium rectifier comprising a carrier electrode having a layer of selenium thereover, a piece of kraft paper having a coating of polystyrene on at least one side thereof, said paper being disposed over a part of the selenium layer with the coated part of the paper contacting the selenium, the polystyrene extending into the pores of the paper and having been forced into the surface of the selenium, and a counterelectrode over the selenium and coated paper layer being in the shape of a washer having outwardly extending arms going to the edges of the rectifier and said coated paper layer defining a clamping area, the active part of the rectifier being beyond the washer.

2. A selenium rectifier comprising a carrier electrode having a layer of selenium thereover, a piece of kraft paper having a coating of a thermoplastic material on at least one side thereof, said paper being disposed over a part of the selenium layer with the coated part of the paper contacting the selenium, the thermoplastic material extending into the pores of the paper and having been forced into the surface of the selenium, and a counter electrode over the selenium and coated paper layer, said coated paper being in the shape of a washer having outwardly extending arms going to the edges of the rectifier and defining a clamping area, the active part of the rectifier being beyond the washer.

3. The selenium rectifier according to claim 2, wherein said thermoplastic material has the characteristic of becoming soft at a temperature below the melting point of selenium and is a member of the class consisting of an acrylate resin, a vinyl resin, a casein plastic, a cellulose plastic, and a polystyrene resin.

References Cited in the file of this patent

UNITED STATES PATENTS

| | | |
|---|---|---|
| 2,314,104 | Richards et al. | Mar. 16, 1943 |
| 2,345,122 | Herrmann | Mar. 28, 1944 |
| 2,444,255 | Hewlett | June 29, 1948 |
| 2,517,602 | Richards et al. | Aug. 8, 1950 |
| 2,752,542 | Nitsche | June 26, 1956 |

UNITED STATES PATENT OFFICE
CERTIFICATION OF CORRECTION

Patent No. 2,981,872                                April 25, 1961

Clarence C. Geib et al.

It is hereby certified that error appears in the above numbered patent requiring correction and that the said Letters Patent should read as corrected below.

Column 2, line 5, after "and the like." insert the following paragraph:

> Examples of suitable thermoplastic materials which may be used are as follows: For acrylate resins such as methacrylate, the products sold under the trade names "Crystalite" and "Plexiglas" by Roehm and Haas Company, and "Lucite" by E. I. du Pont de Nemours & Company, Inc.; for casein plastics, "Ameroid" by American Plastics Corp.; for cellulose plastics, cellulose acetate sold under the trade name "Bakelite" by the Bakelite Corporation, cellulose acetobutyrate sold under the trade name "Tenite II" by Tennessee Eastman Corporation, and cellulose nitrate sold under the trade name "Celluloid" by Celluloid Corporation; for vinyl resins, "Formvar" (Polyvinyl formal) by the Schawinigan Products Corporation, and "Vinylite A" (Polyvinyl chloride alcohol) by Carbon and Carbide Chemicals Corporation.

Signed and sealed this 26th day of September 1961.

SEAL)
Attest:

ERNEST W. SWIDER                                DAVID L. LADD
Attesting Officer                                     Commissioner of Patents